United States Patent [19]

Stephens

[11] Patent Number: 5,249,685

[45] Date of Patent: * Oct. 5, 1993

[54] REUSABLE AND RECYCLABLE PACKAGING FOR SHOCK AND STATIC SENSITIVE OBJECTS

[75] Inventor: Thomas Stephens, Los Gatos, Calif.

[73] Assignee: Roberts, Stephens, Van Amburg, Packaging Inc., Soquel, Calif.

[*] Notice: The portion of the term of this patent subsequent to Jul. 21, 2009 has been disclaimed.

[21] Appl. No.: 916,194

[22] Filed: Jul. 17, 1992

Related U.S. Application Data

[63] Continuation of Ser. No. 771,135, Oct. 3, 1991, Pat. No. 5,131,543.

[51] Int. Cl.⁵ .............................. B65D 85/30
[52] U.S. Cl. ..................... 206/523; 206/334; 206/593; 206/594; 220/403
[58] Field of Search ............... 206/328, 334, 386, 521, 206/523, 524.1, 585, 593, 594; 220/403, 410, 552; 229/120.36

[56] References Cited

U.S. PATENT DOCUMENTS

| | | | |
|---|---|---|---|
| 2,954,140 | 9/1960 | Sutherland | 206/334 |
| 3,120,413 | 2/1964 | Scotti | 229/120.36 |
| 4,103,818 | 8/1978 | Raubenheimer | 229/120.36 |
| 4,180,164 | 12/1979 | Durden et al. | 206/593 |
| 4,527,222 | 7/1985 | Swingley, Jr. | 206/334 |
| 4,527,677 | 7/1985 | March et al. | 206/334 |
| 4,548,350 | 10/1985 | Engle et al. | 229/120.36 |
| 4,684,020 | 8/1987 | Ohlbach | 206/334 |
| 4,699,270 | 10/1987 | Bohm | 206/334 |
| 4,712,674 | 12/1987 | Young | 206/334 |
| 4,966,280 | 10/1990 | Bradford | 206/328 |

FOREIGN PATENT DOCUMENTS 1544665 2/1990 U.S.S.R. ............... 206/328

Primary Examiner—Jimmy G. Foster
Attorney, Agent, or Firm—Fliesler, Dubb, Meyer & Lovejoy

[57] ABSTRACT

The invention provides a dissembleable and reusable package is provided for static, debris and shock sensitive objects. The package comprises a folding box of single piece static dissipative corrugated plastic interlocking configuration. The box has an interlocking bottom, an open top and two pairs of parallel opposite sides. A shock absorbing pad structure fits against the central portions of the sides. The pad structure is a solid self-skinning plastic foam which is static dissipative. It is detachably attachable against the sides utilizing fasteners. A shock absorbing plastic bottom pad fits inside of the box atop its bottom. An open top static dissipative plastic bag fits within the box atop the shock absorbing bottom pad and substantially lines the box. A sensitive object holding structure includes first and second pluralities of static dissipative corrugated plastic walls which interlock with one another, the pluralities of walls being mutually perpendicular. The walls are releasably interlockable with one another and, when interlocked, define a plurality of cavities, each of which is adapted to closely hold one of the sensitive objects. The sensitive object holding structure is of a size to fit within the bag and, when the bag is pushed within the box, is of a size such that the respective opposite ends of the walls are closely adjacent the interiors of the sides of the box.

3 Claims, 3 Drawing Sheets

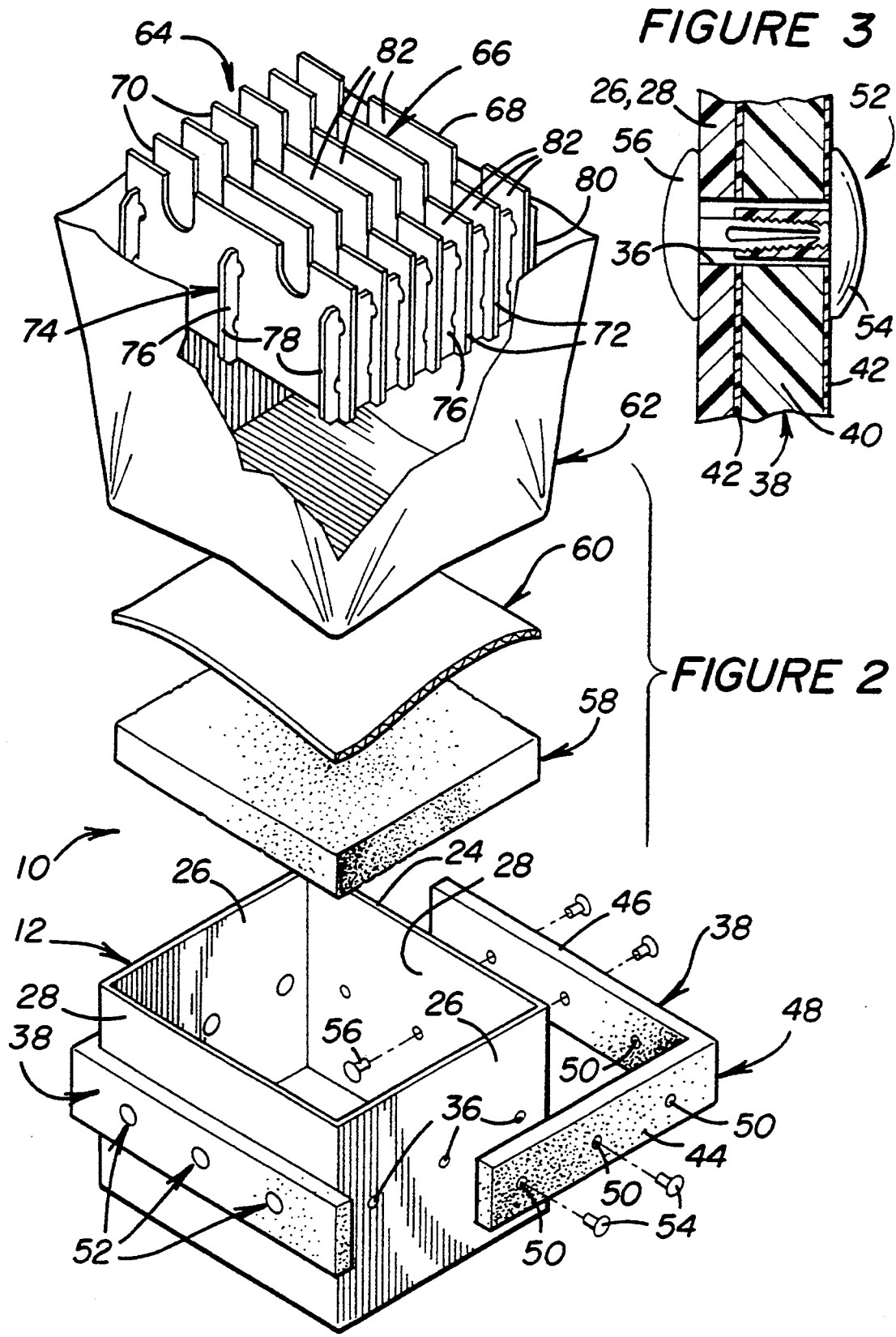

REUSABLE AND RECYCLABLE PACKAGING FOR SHOCK AND STATIC SENSITIVE OBJECTS

This application is a continuation of Ser. No. 07/771,135, filed Oct. 3, 1991, now U.S. Pat. No. 5,131,543.

TECHNICAL FIELD

The present invention relates to the packaging art, more particularly to the art of packaging shock sensitive objects which are also sensitive to static electricity. More specifically still, the invention is related to reusable and recyclable packaging for electronic components such as disc drives.

BACKGROUND OF THE INVENTION

Electronic components, such as disc drives, are sensitive to shock, static charges and particulate matter such as dust. In the past this has often required individual plastic bagging of the components to protect them from debris and from static along with the packaging of the bagged component in a shock absorbing plastic foam. When multiple packaging of components has been utilized the boxes which have formed the packages have generally been glued together and/or have utilized glue to attach shock absorbing padding and the like. Generally the packaging has been thrown away after a single use. The cost of such waste is staggering. The environmental impact is even worse.

The present invention is directed to overcoming one or more of the problems as set forth above.

DISCLOSURE OF INVENTION

In accordance with an embodiment of the present invention a dissembleable and reusable package is provided for static, debris and shock sensitive objects. The package comprises a folding box of single piece interlocking configuration which is made of static dissipative corrugated plastic. The box has an interlocking bottom, an open top and two pairs of parallel opposite sides having respective upper, central and lower portions. A shock absorbing pad structure is provided which fits against the respective central portions of the sides. The pad structure is made of a plastic foam covered with a plastic static dissipative skin. The pad structure is detachably attachable utilizing fasteners against the respective portions of the sides. A shock absorbing plastic bottom pad fits inside of the box atop its bottom. An open top bag is made of static dissipative plastic film and is adapted to fit within the box atop the shock absorbing bottom pad and to substantially line the box. A sensitive object holding structure includes first and second pluralities of static dissipative corrugated plastic walls which interlock with one another, the pluralities of walls being mutually perpendicular. The walls are releasably interlockable with one another and, when interlocked, define a plurality of cavities, each of which is adapted to closely hold one of the sensitive objects. The sensitive object holding structure is of a size to fit within the bag and, when the bag is pushed within the box, is of a size such that the respective opposite ends of the walls are closely adjacent the interiors of the sides of the box.

A package as described above has a number of advantages over the prior art as discussed above. Because the parts are dissembleable the package can be readily broken down and the individual parts can be readily and inexpensively shipped back from the recipient to the sender for reuse. Because the parts are all of plastic they are generally tough enough so as to be reusable many times before replacement. Since no glue is utilized to hold any of the parts together it is not necessary to somehow dissolve away the glue in order to collapse the structure. Insofar as recycling is concerned the plastic corrugated can be ground up and the plastic film of the bag and the foam pieces can be ground up for insulation and carpet mats and the like. The resulting cost savings are obvious. And, such reuse and recycling is clearly advantageous to the environment. Furthermore, the packages can be readily attached to a conventional shipping pad and transported using lift trucks and the like. Use of a pad structure which is of a solid plastic foam covered with a plastic static dissipative skin is particularly advantageous in that it provides shock resistance, static dissipative properties and protection from debris should any of the foam deteriorate.

BRIEF DESCRIPTION OF THE DRAWINGS

The invention will be better understood by reference to the figures of the drawings wherein like numbers denote like parts throughout and wherein:

FIG. 2 illustrates, in top corner perspective and exploded view of the embodiment of FIG. 1;

FIG. 3 illustrates, in partial side sectional view, a detail in the embodiment of FIGS. 1 and 2;

BEST MODE FOR CARRYING OUT INVENTION

Figure 1:
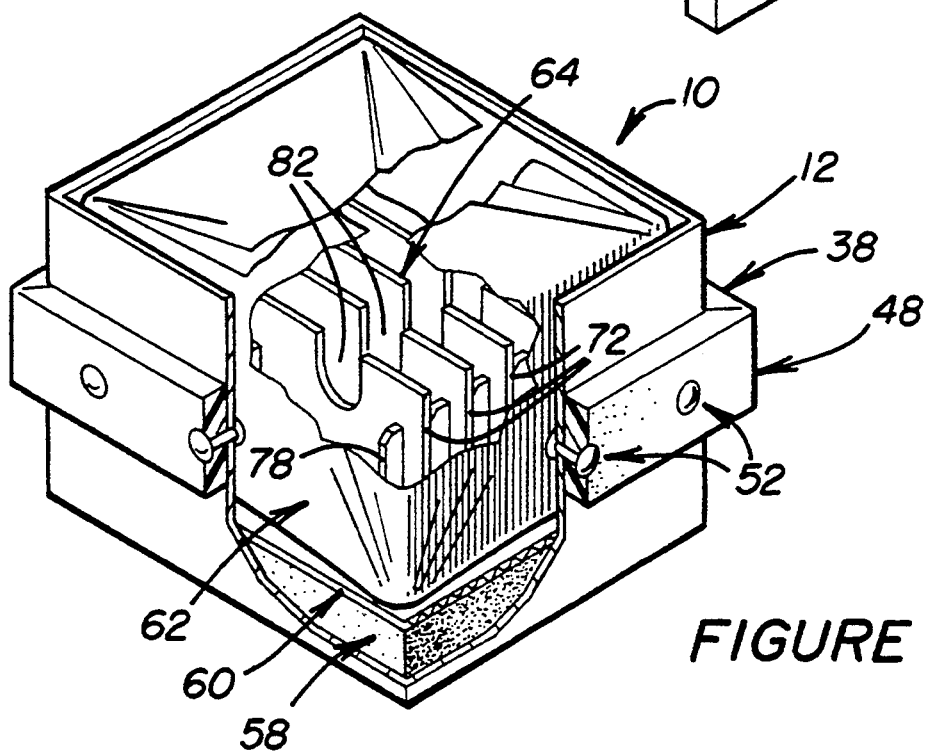
FIG. 1 illustrates, in top corner perspective, partially cut away, a package in accordance with an embodiment of the present invention.
Figure 5:
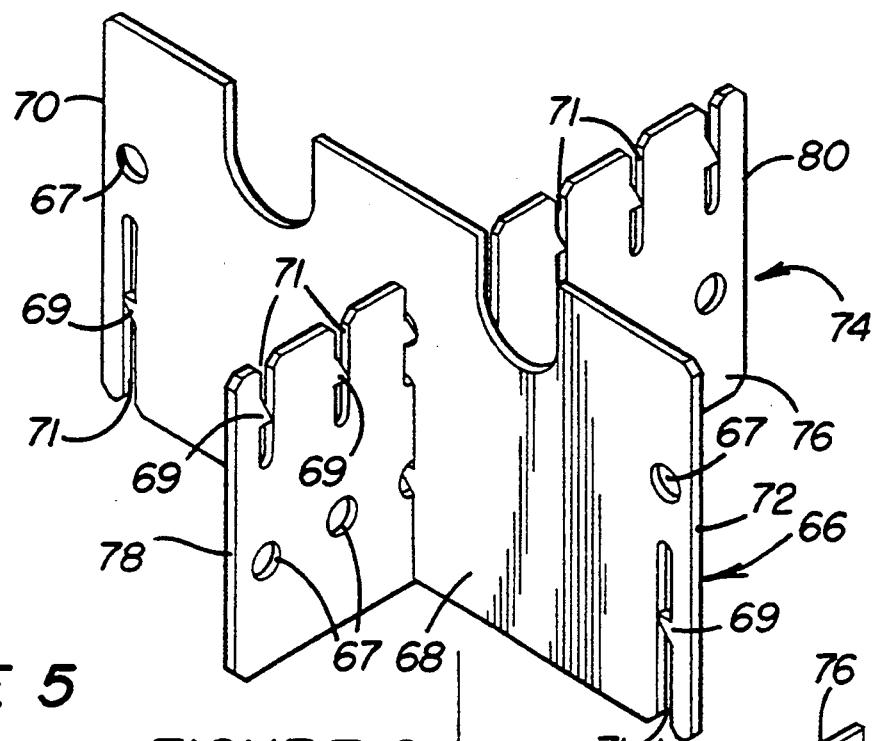
FIG. 5 illustrates, in bottom corner perspective view, the assembled box portion of the embodiment of FIGS. 1 and 2.
Figure 4:
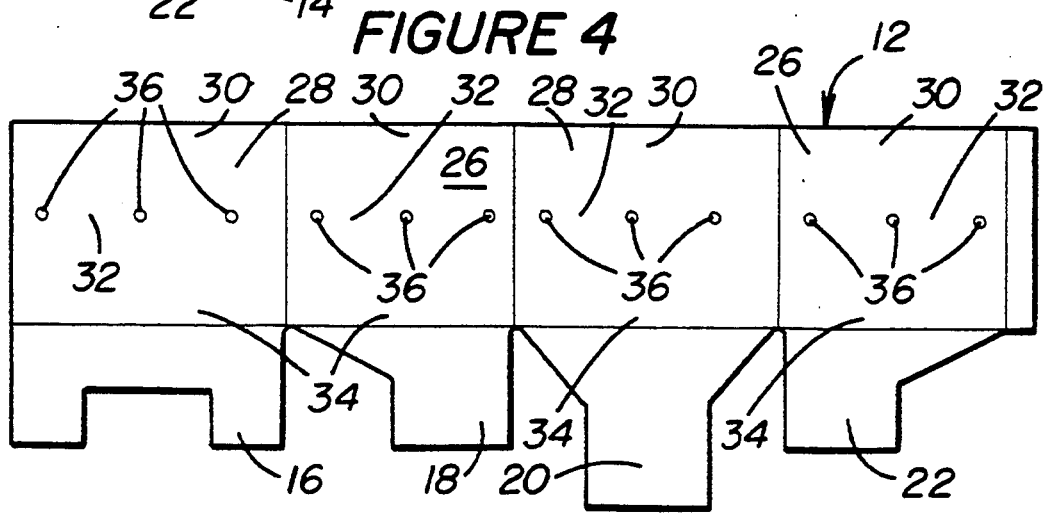
FIG. 4 illustrates, in plan view, a folded flat embodiment of the box portion of the embodiment of FIG. 1.

Adverting to the figures of the drawings, and first primarily to FIGS. 1 and 2, there is illustrated a disassembleable and reusable package 10 in accordance with an embodiment of the present invention. The packaging 10 can be used for packaging static, debris and shock sensitive objects. The package 10 includes a folding box 12 which is of single piece interlocking configuration and is made of static dissipative corrugated plastic. The box 12 (see FIGS. 4 and 5) has an interlocking bottom 14 formed by interlocking tabs 16,18,20 and 22. The box also has an open top 24 (FIG. 2) and two pairs 26,28 of parallel opposite sides. The pairs 26,28 of opposite sides have (see FIGS. 4 and 5) respective upper 30, central 32 and lower 34 portions.

In the particular embodiment illustrated the central portions 32 of the pairs 26,28 of opposite sides have holes 36 therethrough for reasons which will be described shortly.

A shock absorbing pad structure 38, seen in FIGS. 1, 2 and 3, is adapted to fit against the respective central portions 32 of the pairs 26,28 of parallel opposite sides of the folding box 12. As is seen in FIG. 3 the pad structure 38 is made of a solid plastic foam material 40 covered with a plastic static dissipative skin 42. The entire pad structure 38 is manufactured in a single operation and is generally about 1/16th inch thick. The shock absorbing pad structure 38, in the embodiment illustrated, includes (see FIG. 2) a pair of arms 44,46 hinged together by the plastic skin 42 at hinge region 48 whereby each of the pad structures 38 can be folded flat for storage and/or shipment. Each of the pad structures 38 includes a plurality of holes 50 through it adapted to be aligned with the holes 36 in the respective of the two pairs 26,28 of parallel opposite sides of the folding box 12.

As shown in FIGS. 1-3 fasteners 52 are provided for detachably attaching the pad structure 38 against the respective central portions 32 of the pairs 26,28 of parallel opposite sides of the folding box 12. In the particular embodiment illustrated the fasteners 52 include a first or outer member 54 and a second or inner member 56 which interlock with one another as seen most clearly in FIG. 3. The fasteners 52 fit within the holes 36 and 50 and fasten to one another thereby holding the shock absorbing pad structure 38 against the folding box 12. The fasteners 52 can readily detach whereby the pad structures 38 can be disengaged from the folding box 12 for shipment back to the manufacturer and reuse.

As may be seen in FIGS. 1 and 2 a shock absorbing plastic bottom pad 58 is provided to absorb shocks upon the bottom of the reusable package 10. The bottom pad 58 is adapted to fit within the folding box 12 and to sit inside of the box 12 atop its interlocking bottom 14. The static dissipative plastic sheet 60 fits within the folding box 12 and is adapted to sit above the bottom pad 58. The static dissipative plastic sheet serves not only to keep static charges away from the objects or components within the package 10, but also to keep debris from the bottom pad 58 from reaching the components stored within the folding box 12.

Bag 62, made of static dissipative plastic, is adapted to fit within the box 12 atop the shock absorbing bottom pad 58, and, when such is present, above the static dissipative plastic sheet 60, as well. The bag 62 serves to substantially line the box 12 and to hold within it a sensitive object holding structure 54 which will be described in following.

Figure 6:
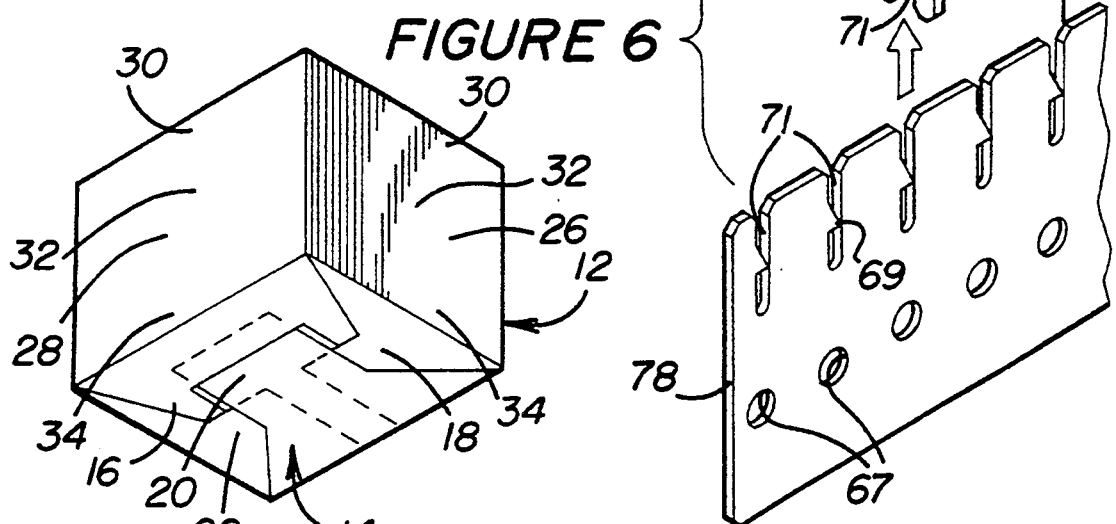
FIG. 6 illustrates, in top corner exploded view, details in the assembly sensitive objects holding structure of the embodiment of FIGS. 1 and 2.

The sensitive object holding structure 54 is seen in FIGS. 1, 2 and 6. It includes a first plurality 66 ,of static dissipative corrugated plastic parallel walls 68 having opposite ends 70,72. The holding structure 64 also includes a second plurality 74 of static dissipative plastic corrugated parallel walls 76 having opposite ends 78,80. The walls 76 of the second plurality of walls 74 are perpendicular to the walls 68 of the first plurality of walls 66. The first and second pluralities 66,74 of walls are releasably interlockable with one another in such a manner as to define a plurality of cavities 82. Each of the cavities 82 is adapted to closely hold one of the sensitive objects.

FIG. 6 shows the interlocking of the parallel walls 68 with the parallel walls 76. Note in this respect the interlocking of the various holes 67 in the sheets with the protrusions 69 in the interlocking sheet with the protrusions 69 being located in appropriate slits 71.

The sensitive objects holding structure 64 is of a size to fit within the bag 62 and when the bag 62 is positioned within the box 12 the holding structure 64 is of a size such that the respective opposite ends 70,72,78,80 of the walls 68,76 are closely adjacent the interiors of the pairs 26,28 of parallel opposite pairs of sides of the box 12. Thus, there is a close sandwiching of the bag 62 between the opposite ends 70,72,78,80 of the walls 68,76 and the interior of the folding box. The bag itself is square bottomed and has a flared top. It is easily extracted, reusable and durable.

Figure 7:
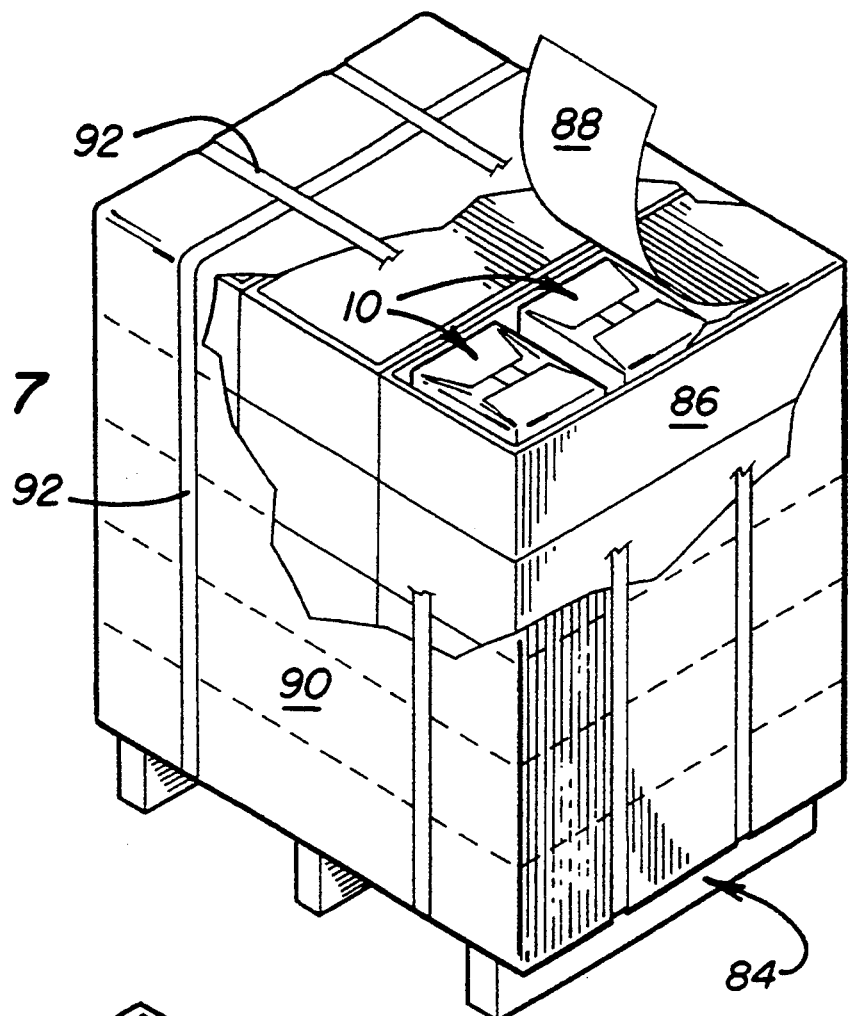
FIG. 7 illustrates, in top corner perspective view, a plurality of packages in accordance with the present invention attached to a conventional shipping pad.

FIG. 7 illustrates a plurality of the packages 10 attached to a conventional shipping pad 84 and with the tops of the bag 62 being folded over. In the particular embodiment illustrated in FIG. 7 three of the packages 10 fit within each of a plurality of larger rectangular boxes 86, each of which is covered with an appropriate corrugated sheet 88. The entire assembly is by covered an exterior wrapping sheet 90 and strapped i place by conventional straps 92. A lift truck can then pick up the entire pad along with, in the embodiment illustrated, forty five of the packages 10 in accordance with the present invention for transport from one location to another, loading on a truck or other shipping vessel, or the like.

It should be noted that the shock absorbing pad structure 38, which includes the solid plastic foam 40 covered with the static dissipative skin 42, forms an important part of the present invention along with the removable fastening of the pad structure 38 to the folding box 12 and the fact that the pap structure 38 can be flattened out for shipment back to the manufacturer. The particular pad structure 38 illustrated is made of self-skinning polyurethane foam which is available commercially from a number cf suppliers, including BASF, but has not been used for the purposes of this invention.

INDUSTRIAL APPLICABILITY

The present invention provides a disassembleable and reusable package 10 for static, debris and shock sensitive objects such as disc drives. The package 10 can be disassembled after the disc drives which have been located in it have been delivered to a recipient, folded substantially flat and inexpensively reshipped to the shipper for reassembly and reuse. Also, the materials of construction are such that they can be recycled if they are damaged. Thus, there is both significant cost saving and a significant environmental improvement attained in accordance with the present invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A package for static and shock sensitive objects, comprising:
   a box made of static dissipative material, the box having a bottom, a top and two pairs of parallel opposite sides having respective upper, central and lower portions;
   a shock absorbing pad structure adapted to fit against the respective central portions of said sides, the pad structure being made of a solid plastic foam, the pad structure having a static dissipative surface;
   fastening means for detachably attaching said pad structure against the respective central portions of said sides; shock absorbing bottom pad means adapted to fit and to sit inside of said box atop its bottom;

a bag made of static dissipative material and adapted to fit within said box above said shock absorbing bottom pad means and to substantially line said box; and a sensitive objects holding structure which includes:
  a first plurality of static dissipative parallel walls having opposite ends; and
  a second plurality of static dissipative parallel walls having opposite ends, the walls of the second plurality being perpendicular to the walls of the first plurality, the first and second pluralities of walls being releasably interlockable with one another in such a manner as to define a plurality of cavities, each cavity being adapted to closely hold one of said sensitive objects, the sensitive objects holding structure being of a size to fit within said bag and, when said bag is positioned within said box of a size such that the respective opposite ends of said walls are closely adjacent the interiors of the sides of the box.

2. A package as set forth in claim 1, further including: an antistatic sheet adapted to fit and to sit atop said bottom pad means and below said bag.

3. A package as set forth in claim 1, wherein the shock absorbing pad structure is of a self-skinning plastic foam construction.

* * * * *